(12) United States Patent
Medarametla Lakshmi

(10) Patent No.: US 12,549,928 B2
(45) Date of Patent: Feb. 10, 2026

(54) COMMUNICATION OF TEXT DATA THROUGH A VOICE CALL

(71) Applicant: T-Mobile USA, Inc., Bellevue, WA (US)

(72) Inventor: Bharath Reddy Medarametla Lakshmi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 422 days.

(21) Appl. No.: 18/170,943

(22) Filed: Feb. 17, 2023

(65) Prior Publication Data

US 2024/0284148 A1 Aug. 22, 2024

(51) Int. Cl.
*H04W 4/16* (2009.01)
*G06F 40/126* (2020.01)
*G06F 40/205* (2020.01)
*H04W 4/14* (2009.01)

(52) U.S. Cl.
CPC ............ *H04W 4/16* (2013.01); *G06F 40/126* (2020.01); *G06F 40/205* (2020.01)

(58) Field of Classification Search
CPC ......... H04W 4/16; H04W 4/14; G06F 40/126; G06F 40/205
See application file for complete search history.

(56) References Cited

U.S. PATENT DOCUMENTS

| | | | |
|---|---|---|---|
| 6,249,808 B1 | 6/2001 | Seshadri | |
| 6,426,956 B1 | 7/2002 | Eteminan | |
| 6,658,389 B1 | 12/2003 | Alpdemir | |
| 6,771,751 B1 * | 8/2004 | Kasturi | H04M 11/08 379/93.27 |
| 6,996,398 B1 | 2/2006 | Powell | |
| 7,656,864 B2 | 2/2010 | Mcniff et al. | |
| 7,787,825 B2 | 8/2010 | Mahajan | |
| 7,813,720 B2 | 10/2010 | Doffman | |
| 8,046,420 B2 | 10/2011 | Pan | |
| 8,081,963 B2 | 12/2011 | Aftab et al. | |
| 8,103,257 B2 | 1/2012 | Delia et al. | |
| 8,136,011 B2 | 3/2012 | Cho et al. | |
| 8,165,801 B1 | 4/2012 | Jintaseranee et al. | |

(Continued)

FOREIGN PATENT DOCUMENTS

| | | |
|---|---|---|
| CN | 108271276 B | 8/2020 |
| CN | 108282906 B | 11/2020 |

(Continued)

*Primary Examiner* — Joseph E Dean, Jr.
(74) *Attorney, Agent, or Firm* — Perkins Coie LLP

(57) ABSTRACT

This document describes techniques, apparatuses, and systems for communication of text data through a voice call. Provided is a voice call between a first user equipment and a second user equipment, during which packets are communicated through a voice channel. Information is requested from the first user equipment. Text conveying the requested information is received at the first user equipment. The text is encoded into data indicative of the text and organized into packets that are marked to indicate the text data within. The packets are transmitted to the second user equipment, where the packets are determined to include text data, and the data indicative of the text is decoded using a decoder associated with text data. In doing so, text data can be communicated through the voice call.

20 Claims, 5 Drawing Sheets

(56) References Cited

U.S. PATENT DOCUMENTS

| | | |
|---|---|---|
| 8,467,812 B2 | 6/2013 | Steer |
| 8,532,654 B2 | 9/2013 | Richardson et al. |
| 8,559,408 B2 | 10/2013 | Delgadillo et al. |
| 8,914,187 B2 | 12/2014 | Wang et al. |
| 8,923,812 B1 | 12/2014 | Koum et al. |
| 9,154,938 B2 | 10/2015 | Salkini et al. |
| 9,380,146 B1 | 6/2016 | Gopalakrishnan et al. |
| 9,531,869 B2 | 12/2016 | Small et al. |
| 9,565,231 B1 | 2/2017 | Naim et al. |
| 9,699,296 B1 | 7/2017 | Rahman et al. |
| 9,736,298 B2 | 8/2017 | Lam et al. |
| 9,848,082 B1 | 12/2017 | Lillard et al. |
| 9,980,104 B2 | 5/2018 | Mahiddini et al. |
| 10,111,078 B2 | 10/2018 | Gellens et al. |
| 10,171,592 B2 | 1/2019 | Qi et al. |
| 10,186,269 B2 | 1/2019 | Yuan |
| 10,477,468 B2 | 11/2019 | Montemurro et al. |
| 10,832,666 B2 | 11/2020 | Felt et al. |
| 2002/0055350 A1 | 5/2002 | Gupte et al. |
| 2003/0145106 A1 | 7/2003 | Brown |
| 2004/0136358 A1 | 7/2004 | Hind et al. |
| 2004/0192299 A1 | 9/2004 | Wilson et al. |
| 2004/0203611 A1 | 10/2004 | Laporta et al. |
| 2007/0005795 A1 | 1/2007 | Gonzalez |
| 2009/0034630 A1 | 2/2009 | Cho et al. |
| 2009/0161609 A1 | 6/2009 | Bergstrom |
| 2010/0263015 A1 | 10/2010 | Pandey et al. |
| 2011/0149845 A1 | 6/2011 | Song et al. |
| 2014/0273974 A1 | 9/2014 | Varghese et al. |
| 2018/0121050 A1 | 5/2018 | Ramprasad |

FOREIGN PATENT DOCUMENTS

| | | |
|---|---|---|
| CN | 113098962 A | 7/2021 |
| CN | 114785842 B | 8/2022 |
| DE | 10203537 B4 | 7/2005 |
| DE | 102011113052 A1 | 3/2012 |
| DE | 102011000134 B4 | 8/2014 |
| DE | 112013005290 B4 | 12/2022 |
| EP | 1068692 A1 | 1/2001 |
| EP | 1350377 A2 | 10/2003 |
| EP | 1702481 A2 | 9/2006 |
| EP | 1708382 A1 | 10/2006 |
| EP | 1319294 B1 | 10/2009 |
| EP | 2850805 A2 | 3/2015 |
| EP | 3100445 A1 | 12/2016 |
| EP | 3435589 B1 | 4/2020 |
| EP | 3754903 B1 | 9/2022 |
| JP | 3037947 B2 | 5/2000 |
| JP | 4073668 B2 | 2/2008 |
| KR | 20010081872 A | 8/2001 |
| KR | 20040046312 A | 6/2004 |
| KR | 20040048115 A | 6/2004 |
| KR | 20050091247 A | 9/2005 |
| KR | 100571340 B1 | 4/2006 |
| KR | 100571341 B1 | 4/2006 |
| KR | 100671718 B1 | 1/2007 |
| KR | 101106491 B1 | 1/2012 |
| KR | 20200007634 A | 1/2020 |
| WO | 02076099 A1 | 9/2002 |
| WO | 2008150815 A2 | 12/2008 |
| WO | 2011023361 A1 | 3/2011 |
| WO | 2011046439 A1 | 4/2011 |
| WO | 2014074936 A2 | 5/2014 |
| WO | 2017211255 A1 | 12/2017 |
| WO | 2020141643 A1 | 7/2020 |
| WO | 2021143095 A1 | 7/2021 |

\* cited by examiner

COMMUNICATION OF TEXT DATA THROUGH A VOICE CALL

BACKGROUND

Voice calls enable audio data to be communicated between two wireless devices through packets. Businesses utilize voice calls to communicate with users, vendors, or their workforce. For example, a business may have customer service agents that handle customer service requests. During a customer service request, a user may need to provide information to the customer service agent, such as their name, email, address, order number, or credit card number. To do so, the user may speak the information into a wireless device to enable the information to be communicated to the customer service agent through the voice call. In some cases, however, the user is located in a public location and the requested information is private, such that the user is not comfortable speaking the information out loud to the customer service agent. Moreover, the customer service agent may mishear the user, which may cause the provided information to be recorded incorrectly.

BRIEF DESCRIPTION OF THE DRAWINGS

Detailed descriptions of implementations of the present invention will be described and explained through the use of the accompanying drawings.

Figure 1:
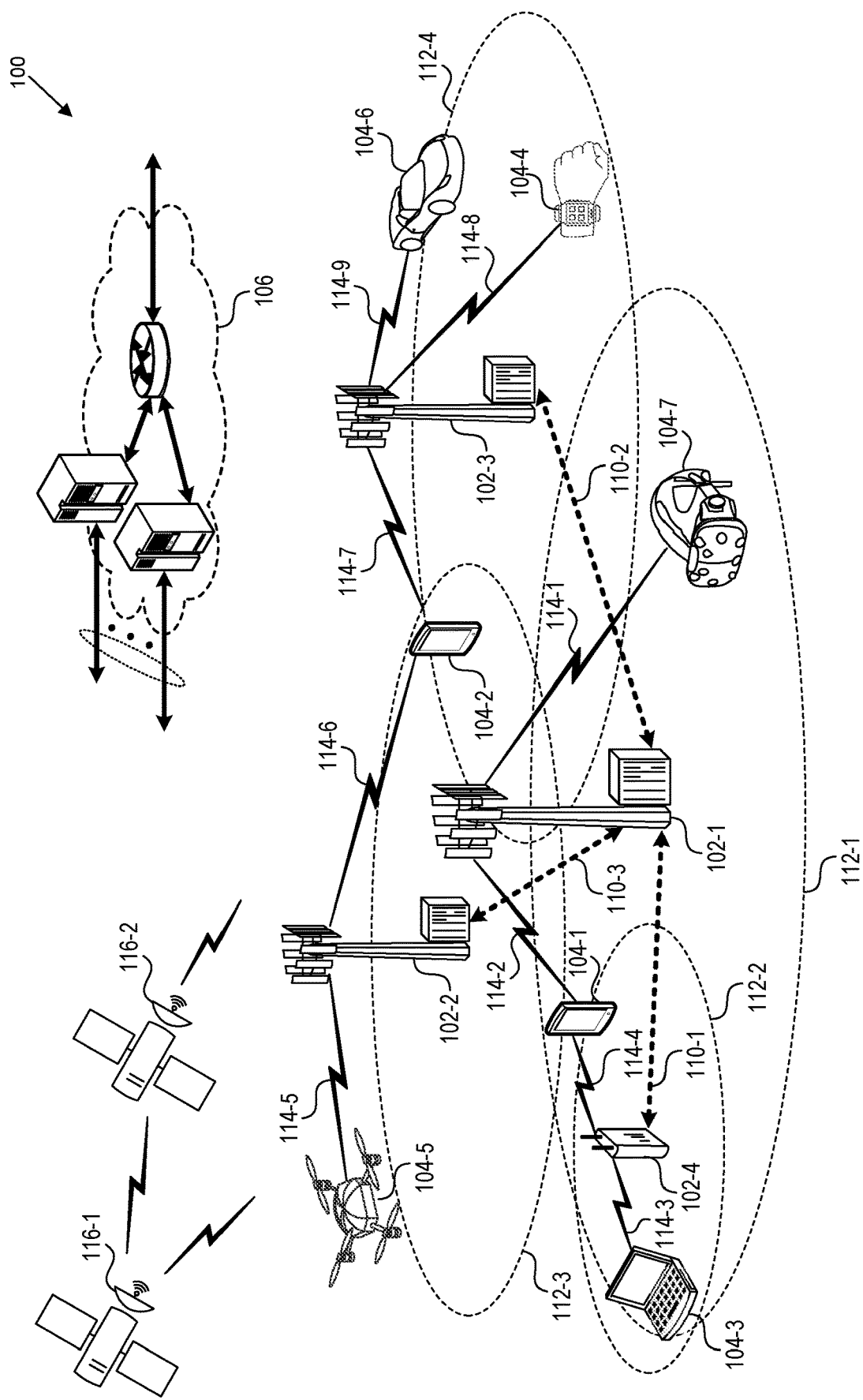
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Wireless devices communicate through base stations connected to mobile networks. Many wireless devices are implemented with voice call connectivity to enable audio data to be communicated through a voice call on the network. For example, a first user and a second user can communicate through a voice call. The first user can request information from the second user. In response, the second user can speak the information into their wireless device. The information can then be transmitted as audio data using the network and played on the first user's wireless device. In some situations, however, the second user may prefer not to speak the requested information out loud. For example, the second user may choose not to speak the information because they are located in a public area and the information is private (e.g., name, email, phone number, or credit card number) or because the second user is in a loud environment where their spoken word will likely be misunderstood. Accordingly, the second user can benefit from an additional communication mechanism that does not require spoken word.

One option is to send the requested information through Short Message Service (SMS) or Rich Communication Services (RCS), often referred to as text messaging. Using text messaging, the second user can communicate text or pictures to the first user through a separate communication mechanism outside of the voice call without requiring the second user to speak. However, some wireless devices, such as landlines or call center phones, do not have text messaging capability. Another option is to use dual-tone multi-frequency (DTMF) signaling, which converts numbers input by the second user into tones to communicate the requested information through the voice call. In some cases, however, the requested information can include non-numeric characters or other information (e.g., pictures) that cannot be communicated using only numbers.

To solve these problems and others, the present technology describes techniques, apparatuses, and systems that communicate text data through a voice between a first user equipment and a second user equipment. Consider, for example, a customer service call in which a customer service agent is processing a customer service request from a user. The customer service agent requests information from the user, such as the user's name, address, and email, to process a product exchange. The user, being in a public place within close proximity of others, chooses not to say the sensitive information out loud but instead type text conveying the information through a user interface (e.g., graphical user interface (GUI)). The text is then encoded into text data and organized into packets sent through the voice call without requiring a different communication mechanism. The packets can be marked (e.g., using a header) to indicate that they contain text information and should be handled differently than packets containing audio data. The packets are received through the voice call and determined to contain text data. As a result, the packets are decoded using a decoder that is associated with text data, which can create decoded data indicative of the requested information. The decoded data can then be displayed to the customer service agent to communicate the requested information without the risk of it being misheard.

In some cases, the requested information can be stored in a server without intervention from the customer service agent, thus removing the likelihood of the customer service agent transcribing the information improperly. For example, the decoded data can be parsed to isolate the requested information. If multiple types of information are included in the requested information (e.g., name, email, and address), each portion of the requested information can be isolated from the decoded data and stored in the server at the associated location. In some cases, the text can be input by the user in a specific configuration such that the decoded data can be more easily parsed. For example, the text can be entered so that the requested information appears in a particular order (e.g., name first, email second, address third) or in a particular format (e.g., name is written as last name, first name). Given that the requested information can be stored in the server without intervention from the customer service agent, the requested information need not be visible to the customer service agent. For example, the requested information can be stored in the server without being output to the customer service agent. In this way, additional privacy can be provided when communicating sensitive information (e.g., credit card number or social security number).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/

VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits per second data transmission in the era of 6G and beyond, such as terabit-per-second backhaul systems, ultra-high definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
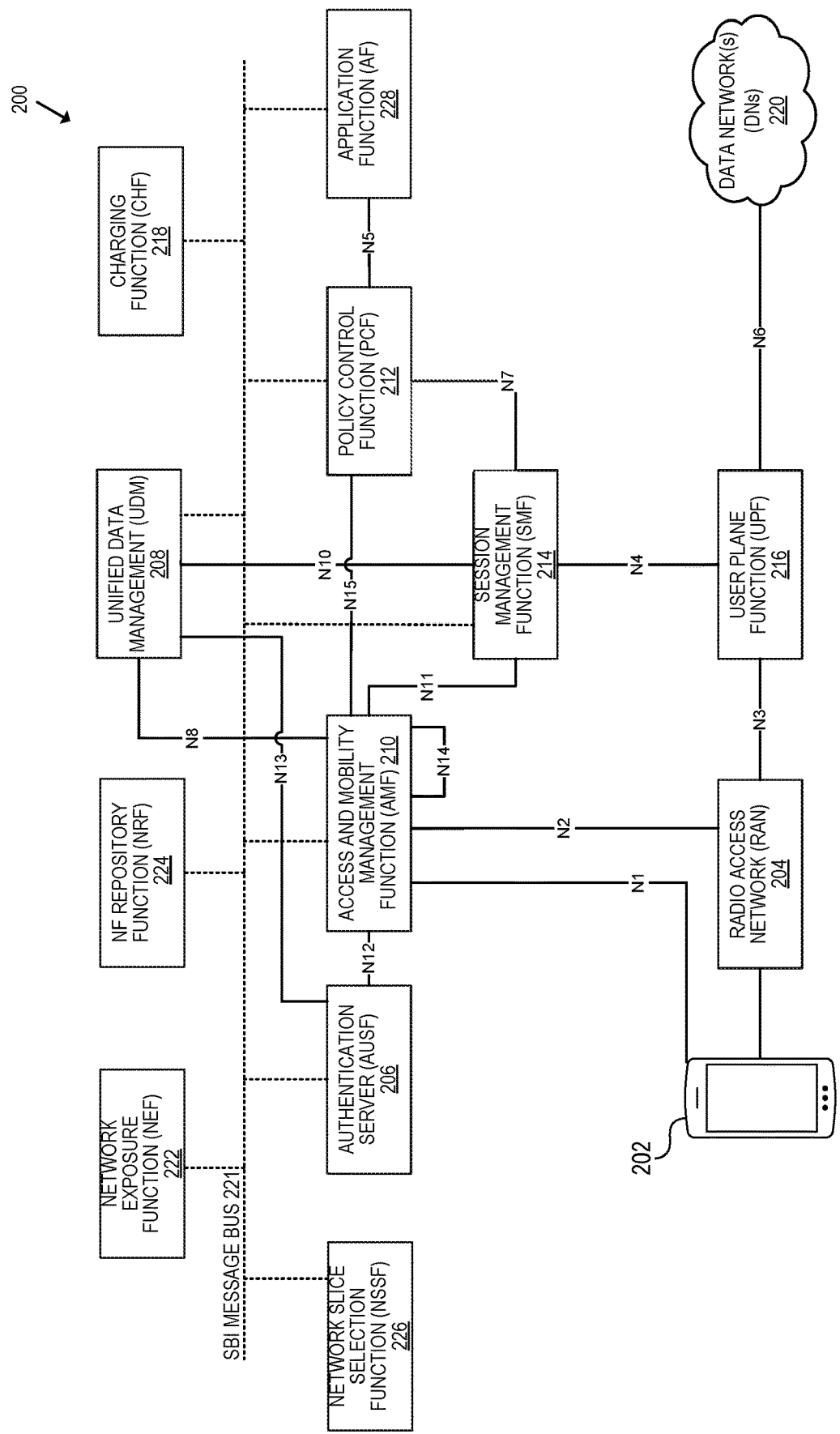
FIG. 2 illustrates 5G core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214, assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes Network Slice selection, which is regulated by the NSSF 226.

Communicating Text Data Through a Voice Call

Figure 3:
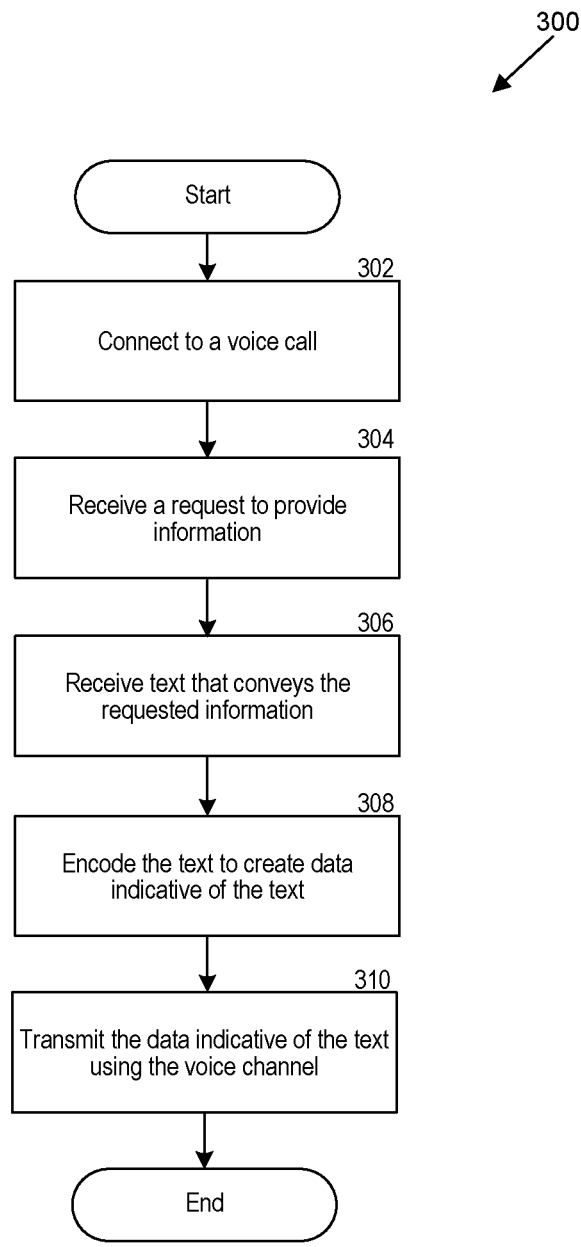
FIG. 3 illustrates an example method in accordance with aspects of the present technology.

FIG. 3 illustrates an example method 300 for communicating text data through a voice call. In aspects, the method 300 can be performed at a wireless device, such as a mobile device. The wireless device can include or be connected to a system that enables the reception of text and the organization of text into packets that can be transmitted through a voice call. The system can connect to the wireless device or a remote terminal of the network.

At 302, a voice call is connected between a first wireless device and a second wireless device. In aspects, the wireless devices can include any device capable of wireless communication, including those detailed above with respect to FIG. 1. As a specific example, the first wireless device can include a mobile device, such as a smartphone, and the second wireless device can include a call center telephony device, such as a virtual phone for a customer service team. In aspects, one or both of the first and second wireless devices are not capable of communicating using SMS or RCS. The voice call can utilize any wireless communication technology capable of communicating audio data between at least two end points. For example, the voice call can include a Voice over Internet Protocol (VoIP) service or a Voice over LTE (VOLTE) service. The voice call can utilize a voice channel to communicate packets that include audio data between the first and second wireless devices.

At 304, the first wireless device receives a request to provide information to the second wireless device. The request can include a spoken request by a user of the second wireless device asking a user of the first wireless device to provide information. In other cases, the request can include a typed request (e.g., sent through the voice call or otherwise) or an automated request to provide information to the second wireless device. For example, the user of the second wireless device can type a request for information that is transmitted to the first wireless device, or the request can be transmitted in response to connecting the voice call. The request can be output to the user of the first wireless device, for example, through a speaker or on a display of the first wireless device.

The requested information can include information needed by the user of the second wireless device to complete a task requested by the user of the first wireless device. For example, the voice call can be concerning a customer service request and the requested information can include an order number, serial number, user's name, user's email, user's address, credit card number, social security number, or any other information associated with the user or the customer service request. The requested information can include multiple categories of information. For example, the requested information can include a user's name, email, and address.

In some cases, the request can include a desired configuration of the information. For example, the user of the second wireless device can communicate (e.g., verbally or otherwise) the order in which the information is to be provided (e.g., name then email then address). In yet another aspect, the desired configuration can include the desired format of the information. For example, if a birth date is requested, the request can specify whether the information should be provided as YYYY-MM-DD or MM/DD/YYYY, where "M" is a character representing the month, "D" is a character representing the day, and "Y" is a character representing the year.

At 306, the first wireless device can receive text that conveys the requested information. The first wireless device can provide a user interface through which the user of the first wireless device can input the information. The user interface can be provided in response to receiving the request or through control by the user of the first wireless device. In aspects, the user interface is a GUI (e.g., virtual keyboard) through which the user can type in text indicative of the requested information without speaking. In another example, the user can speak the requested information into a microphone of the first wireless device, and the speech can be converted into text.

The text can include American Standard Code for Information Interchange (ASCII) characters or any other characters. In aspects, the text includes one or more non-numeric (e.g., alphabetic) characters, such as "a," "b," "c," and so on. The text can be received in a particular configuration, for example, based on the configuration requested by the second wireless device. The user interface can prompt the user for this particular configuration, for example, by indicating the desired configuration of the information (e.g., outputting "please provide your name in the format last name, first name") or by enabling inputs next to the desired categories of information (e.g., outputting "Name: _____; Email: _____; Address: _____"). In other implementations, the user can input the text to the first wireless device in any configuration, and the text can be rearranged into the desired configuration. In yet another aspect, the user can input other forms of data to be communicated through the voice call. For example, the user can transmit one or more pictures along with or instead of the text.

At 308, the text is encoded to create data indicative of the text. The text can be encoded using an encoder that is associated with text data (e.g., instead of an encoder that is associated with audio data). In aspects, the encoder is different from an encoder used to encode data for DTMF signaling. The data indicative of the text can then be organized into one or more data packets for transmission through the voice call. In aspects, the packets utilize a same protocol as the packets containing audio data. For example, the data can be encoded into Real-time Transport Protocol (RTP) packets. The packets can be marked to indicate that the packets include text data. For example, the packets can include headers that identify that the packets contain text data. The headers can include one or more bits that provide details regarding the contents of the packets, such as the packet size, the number of packets, a protocol through which to handle the packets, or that the packets include text data.

At 310, the data indicative of the text is transmitted using the voice channel (e.g., in the user plane). For example, the packets that contain the text data can be transmitted through the voice call on a same channel used to transmit the packets that contain the audio data. The packets that contain the text data can be intermittent with other packets that contain audio data. The packets are communicated without requiring an additional communication session to operate in parallel to the voice call. For example, the packets can be communicated exclusive of SMS or RCS.

Figure 4:
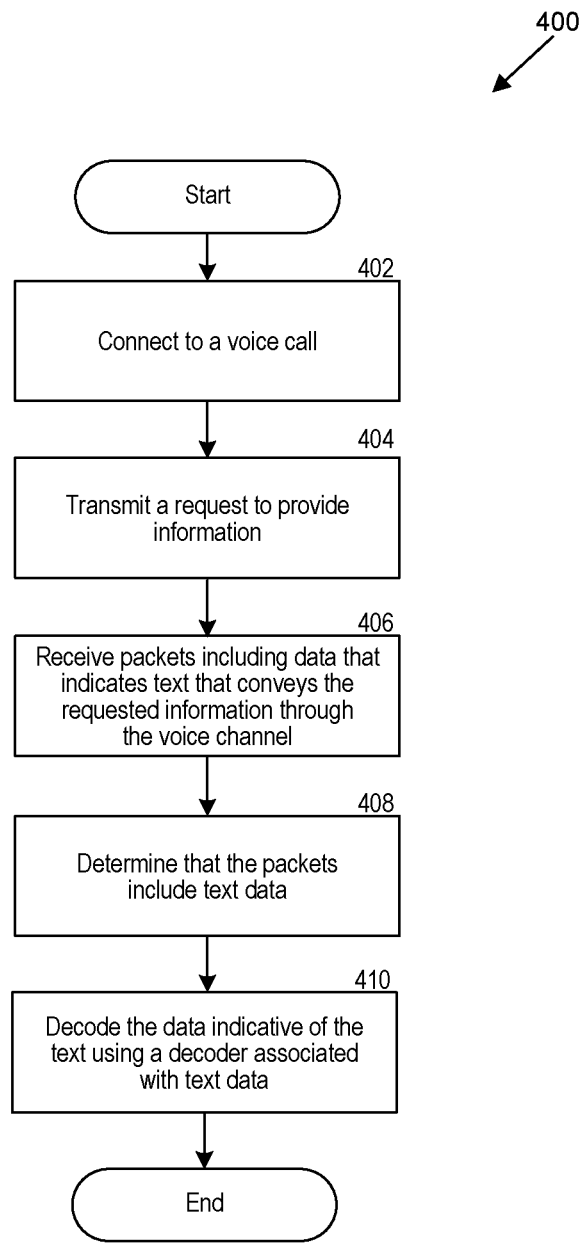
FIG. 4 illustrates an example method in accordance with aspects of the present technology.

FIG. 4 illustrates an example method 400 in accordance with aspects of the present technology. In aspects, the method 400 can be performed at a wireless device. In aspects, the wireless device is not capable of communicating using SMS or RCS. For instance, the wireless device can be a virtual phone without messaging capability installed on a laptop or desktop. Instead, text data is communicated through the voice call. The wireless device can include or be connected to a system that handles the communication of text data through the voice call. For example, the system can handle reception of packets that include text data. Moreover, the system can interface with a server to automatically process and store the text data communicated through the voice call. The system can connect to the wireless device or a remote terminal of the network.

At 402, a voice call is connected between the first wireless device and the second wireless device. In aspects, the voice call and the first and second wireless devices can be similar to those described with respect to FIG. 3. At 404, a request to provide information is transmitted from the second wireless device to the first wireless device. In aspects, the request can be a verbal, typed, or automated request, as described with respect to FIG. 3. The request can include one or more categories of requested information and specify a particular configuration for the requested information.

At 406, one or more packets are received that include data indicating text that conveys the requested information. In some cases, the packets can include other types of data, such as graphical data. The packets are received through the voice call using the voice channel. In aspects, the packets can be similar to the packets described with respect to FIG. 3. At 408, the packets are determined to include text data. The packets can be marked to indicate that the packets contain text data (e.g., or any other type of data). For example, the packets can include at least one bit in a header that indicates that the packets include text data. The header can be analyzed to determine the type of data within the packets. In aspects, when it is determined that the packets include text data, the packets can be handled using a different protocol than the packets that include voice data, or the packets can be decoded using a different decoder.

At 410, the data indicative of the text is decoded using a decoder associated with text data. For example, the data can be decoded using a text decoder instead of an audio data decoder (e.g., a DTMF decoder). In cases where graphical data is included, the graphical data can be decoded using a decoder associated with graphical data. In aspects, the data can be extracted from the packets and processed in accordance with a particular protocol (e.g., associated with text data). The decoded data can correspond to the text that indicates the requested information. In some cases, the decoded data can be output to the user of the second wireless device (e.g., using a display or speaker accessible to the second wireless device), and the user of the second wireless device can complete a task associated with the voice call using the requested information. For example, the user of the second wireless device can store the requested information in a server.

In yet another aspect, the decoded data can be used to accomplish a task associated with the voice call without outputting the requested information to the user of the second wireless device. For example, the requested information can be extracted from the decoded data and stored in a server without intervention by the user of the second wireless device. The decoded data can be parsed to separate the requested information. For example, if multiple categories of information are requested, the decoded data can be separated into each of the multiple categories. In instances in which the information is requested in a particular configuration, the decoded data can be parsed based on the particular configuration. For instance, if the expected configuration is first name, last name, email, the decoded data can be separated into three segments using spaces as the delimiters. The first segment can then be assigned as the first name, the second segment as the last name, and the third segment as the email. Alternatively, or additionally, the decoded data can be parsed based on an expected character. For example, if the decoded data (e.g., or a segment of the decoded data) includes "@," that segment can be assigned as an email.

In some cases, the decoded data cannot be parsed and categorized into the appropriate type of information. For example, the decoded data can include a phone number, which has a similar format to a phone number or an order number. As a result, the decoded data cannot simply be categorized as a phone number and stored in the proper location within the server. In some embodiments, a request can be sent to the user of the first or second wireless device to disambiguate the decoded data (e.g., by asking "Is this a phone number?" or "Is this a phone number or a order number?" or by simply requesting the user to categorize the information). Once the decoded data is disambiguated by the user, the data can be stored at the associated location in the server. Although specific examples are described, other techniques can be used to parse the decoded data, which can enable the information to be stored at respective locations in the server.

In some cases, the packets are determined to include text data (e.g., or, more specifically, private text data) at a remote terminal of the wireless network, and in response, the packets are not routed to the second wireless device. Instead, the processing of the data packets can be handled at the remote terminal, and the requested information can be stored in a server without ever reaching the second wireless device.

As a result, the requested information can be maintained with a higher level of privacy.

Computer System

Figure 5:
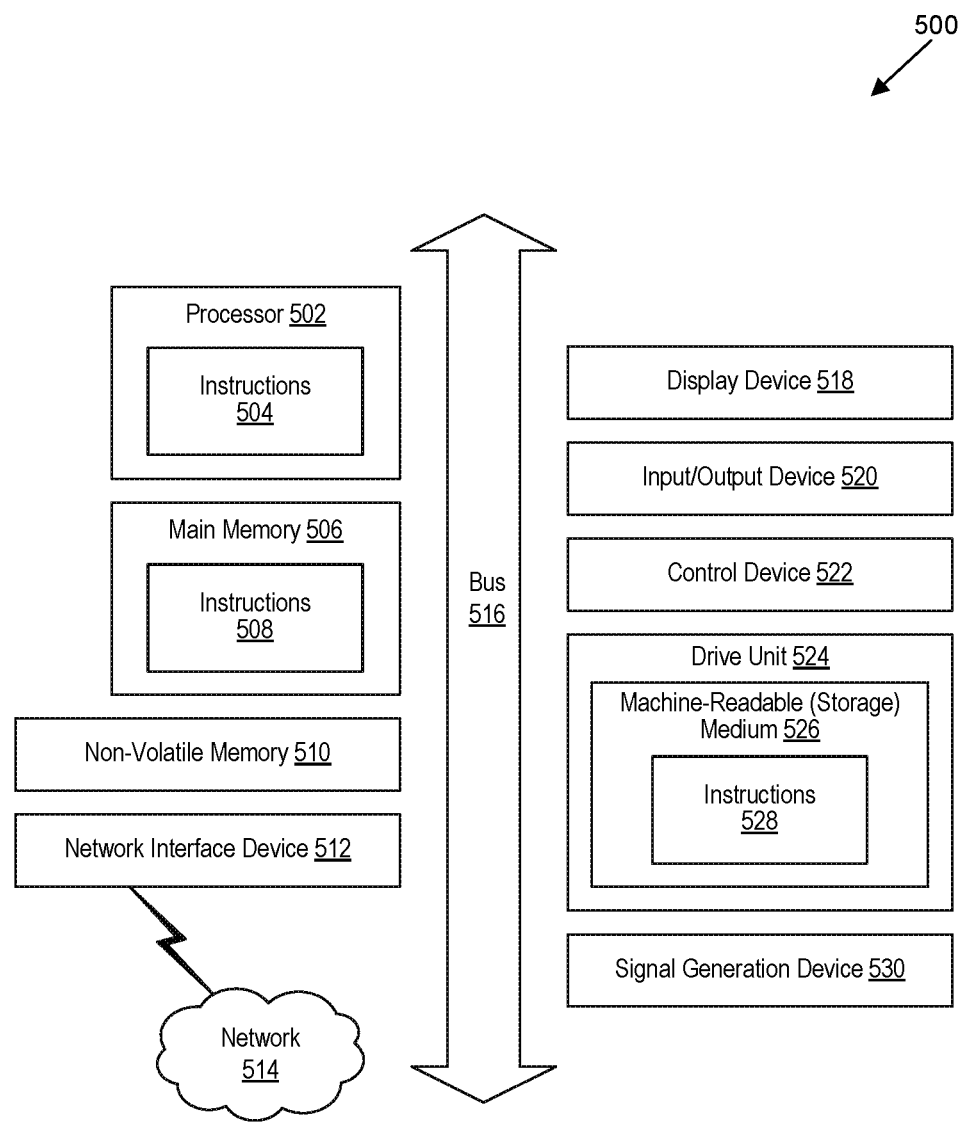
FIG. 5 illustrates an example computer system in which at least some aspects of the present technology can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, which stores instructions 528 to be executed by the one or more processors 502, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system, such as a mesh of computer systems, or can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, and 528) set at various times in various memory and storage devices in computing device(s). When read and executed by the processor 502, the instruction(s) cause the computer system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; and the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method comprising:
providing a voice call between a first wireless device and a second wireless device,
wherein voice packets associated with the voice call are communicated between the first wireless device and the second wireless device using a voice channel;
during the voice call:
receiving, at the first wireless device, a request to provide information to the second wireless device;
receiving, at a graphical user interface of the first wireless device, text that conveys the information that has been requested,
wherein the text includes at least one alphabetic American Standard Code for Information Interchange (ASCII) character;
transmitting, to the second wireless device and using the voice channel, one or more packets that include data indicative of the text,
wherein the data indicative of the text is not dual-tone multi-frequency signaling;
receiving, at the second wireless device, one or more packets that include data indicative of text that conveys the information that has been requested,
wherein the one or more packets include an indication that the one or more packets include text data;
determining, based on the indication, that the one or more packets include text data; and
responsive to determining that the one or more packets include text data, decoding the data indicative of the text using a decoder associated with text data.

2. The method of claim 1, wherein:
the request to provide information includes a request to provide one or more categories of information;
the text has a predetermined configuration; and
the method further comprises:
parsing the decoded data based on the predetermined configuration to categorize one or more portions of the decoded data into the one or more categories; and
storing the one or more portions of the decoded data into a server based on the one or more categories.

3. The method of claim 1, further comprising:
parsing the decoded data to categorize one or more portions of the decoded data into one or more categories;
determining an ambiguity in the decoded data such that a particular portion of the decoded data cannot be categorized into a single category of the one or more categories;
responsive to determining the ambiguity, sending a request to a user of the first wireless device or the second wireless device to disambiguate the particular portion of the decoded data with respect to the one or more categories.

4. The method of claim 1, further comprising storing the decoded data into a server without intervention from a user of the second wireless device.

5. The method of claim 1, further comprising receiving, at the first wireless device, a voice packet from the second wireless device that includes the request to provide information to the second wireless device.

6. The method of claim 1, wherein the one or more packets do not include a Short Message Service (SMS) packet or a Rich Communication Services (RCS) packet.

7. The method of claim 1, wherein the decoder associated with the text data does not include a dual-tone multi-frequency decoder.

8. The method of claim 1, further comprising outputting the decoded data indicative of the text on the second wireless device, wherein outputting the decoded data includes displaying the decoded data on a display of the second wireless device or audibly outputting the decoded data through a speaker of the second wireless device.

9. A system comprising:
at least one processor; and
at least one non-transitory computer-readable storage medium storing instructions, which, when executed by the at least one processor, cause the system to:
connect to a voice call between a first wireless device and a second wireless device,
wherein voice packets associated with the voice call are communicated between the first wireless device and the second wireless device using a voice channel;
receive, at the first wireless device, a request to provide information to the second wireless device;
provide, at the first wireless device, a graphical user interface capable of receiving one or more American Standard Code for Information Interchange (ASCII) characters that are input by a first user of the first wireless device;
receive, at the graphical user interface, text that conveys the information that has been requested to be provided to the second wireless device,
wherein the text includes at least one alphabetic ASCII character;
encode the text using an encoder associated with text data to create data indicative of the text,
wherein the text data is not encoded into the data indicative of the text using a dual-tone multi-frequency scheme; and
transmit, to the second wireless device and using the voice channel, one or more packets that include the data indicative of the text,
wherein the one or more packets include an indication that the one or more packets include text data.

10. The system of claim 9, wherein the one or more packets do not include a Short Message Service (SMS) packet or a Rich Communication Services (RCS) packet.

11. The system of claim 9, wherein the encoder associated with the text data does not include a dual-tone multi-frequency encoder.

12. The system of claim 9, wherein the first wireless device includes a mobile phone.

13. The system of claim 9, wherein:
the request to provide information includes a request to provide one or more categories of information and a predetermined configuration for the text; and
the text is received in the predetermined configuration.

14. At least one non-transitory computer-readable storage medium storing instructions, which, when executed by at least one processor of a system, cause the system to:
connect to a voice call between a first wireless device and a second wireless device,
wherein voice packets associated with the voice call are communicated between the first wireless device and the second wireless device using a voice channel;
transmit, to the first wireless device, a request to provide information to the second wireless device;
receive, at the second wireless device and using the voice channel, one or more packets that include data indicative of text that conveys the information requested to be provided to the second wireless device,
wherein the text includes at least one alphabetic American Standard Code for Information Interchange (ASCII) character,
wherein the one or more packets include an indication that the one or more packets include text data;
determine, based on the indication, that the one or more packets include text data; and
responsive to determining that the one or more packets include text data, decode the data indicative of the text that conveys the information requested to be provided to the second wireless device using a decoder associated with text data,
wherein the data indicative of the text is not decoded using a dual-tone multi-frequency scheme.

15. The at least one non-transitory computer-readable storage medium of claim 14, wherein:
the request to provide information includes a request to provide one or more categories of information;
the text has a predetermined configuration; and
the instructions further cause the system to:
parse the decoded data based on the predetermined configuration to categorize one or more portions of the decoded data into the one or more categories; and
store the one or more portions of the decoded data into a server based on the one or more categories.

16. The at least one non-transitory computer-readable storage medium of claim 14, wherein the instructions further cause the system to store the decoded data into a server without intervention from a user of the second wireless device.

17. The at least one non-transitory computer-readable storage medium of claim 14, wherein the one or more packets do not include a Short Message Service (SMS) packet or a Rich Communication Services (RCS) packet.

18. The at least one non-transitory computer-readable storage medium of claim 14, wherein the decoder associated with the text data does not include a dual-tone multi-frequency decoder.

19. The at least one non-transitory computer-readable storage medium of claim 14, wherein the second wireless device includes a virtual phone.

20. The at least one non-transitory computer-readable storage medium of claim 14, wherein:
the request to provide information includes a request to provide one or more categories of information; and
the instructions further cause the system to arrange the text into a predetermined format based on the one or more categories of information.

* * * * *